United States Patent
Dusanapudi et al.

(10) Patent No.: US 9,940,226 B2
(45) Date of Patent: Apr. 10, 2018

(54) SYNCHRONIZATION OF HARDWARE AGENTS IN A COMPUTER SYSTEM

(71) Applicant: International Business Machines Corporation, Armonk, NY (US)

(72) Inventors: Manoj Dusanapudi, Bangalore (IN); Shakti Kapoor, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 2 days.

(21) Appl. No.: 15/165,007

(22) Filed: May 26, 2016

(65) Prior Publication Data

US 2017/0344466 A1 Nov. 30, 2017

(51) Int. Cl.
*G06F 9/44* (2006.01)
*G06F 9/45* (2006.01)
*G06F 11/36* (2006.01)
*G06F 12/0837* (2016.01)
*G06F 12/084* (2016.01)

(52) U.S. Cl.
CPC ...... *G06F 11/3688* (2013.01); *G06F 11/3684* (2013.01); *G06F 12/084* (2013.01); *G06F 12/0837* (2013.01); *G06F 2212/1008* (2013.01)

(58) Field of Classification Search
CPC .......................... G06F 11/3688; G06F 11/3684
USPC .................................................. 717/124, 141
See application file for complete search history.

(56) References Cited

U.S. PATENT DOCUMENTS

| 5,355,471 | A | * | 10/1994 | Weight | G06F 11/22 |
| | | | | | 714/10 |
| 7,581,222 | B2 | * | 8/2009 | Blainey | G06F 9/522 |
| | | | | | 718/102 |
| 7,788,468 | B1 | | 8/2010 | Nickolls et al. | |
| 7,984,242 | B2 | | 7/2011 | Collard et al. | |
| 8,131,935 | B2 | | 3/2012 | Arimilli et al. | |
| 8,412,507 | B2 | | 4/2013 | Adir et al. | |
| 8,656,400 | B2 | | 2/2014 | Foo | |
| 8,832,712 | B2 | | 9/2014 | Houston et al. | |
| 2007/0016829 | A1 | * | 1/2007 | Subramanian | G06F 11/3684 |
| | | | | | 714/38.1 |

* cited by examiner

*Primary Examiner* — Wei Zhen
*Assistant Examiner* — Lanny Ung
(74) *Attorney, Agent, or Firm* — Martin & Associates, LLC; Bret J. Petersen

(57) ABSTRACT

A system and method synchronizes heterogeneous agents in a computer system with a software synchronization mechanism. Agents of the computer system connected to a common memory, including agents lacking a hardware synchronization system, can be synchronized with the software synchronization mechanism. The synchronized agents can cause collisions on the same cache line in order to stress test the memory of the system. Each agent updates a first array to indicate it has arrived at the synchronization. After all the agents have arrived, each agent then updates a second array to announce its exit.

15 Claims, 7 Drawing Sheets

1. Lock_addr2 is checked for init value of "0" in both indices in the array.
    - Lock_addr1[0,1] = {0,0}
2. Agent1 writes its index
    - Lock_addr1[0,1]={1,0}
    - Checks in loop, each index, adds to lock_addr1_sum and checks if its 2
3. Agent2 writes its index
    - Lock_addr1[0,1]={1,1}
    - Checks in loop, each index, adds to lock_addr1_sum and checks if its 2,
    - Since the sum is 2 Agent2 quits the loop
    - Agent1 also quits loop at this point.
4. Agent2 sets lock_addr2 index
    - Lock_addr2[0,1]={0,1}
    - Check in loop for the sum lock_addr2_sum to see if both agents set to 1.
    - Since Agent1 is not set, it will loop
5. Agent1 sets lock_addr2 index
    - Lock_addr2[0,1]={1,1}
    - Check in loop for the sum lock_addr2_sum to see if both agent bits are set to 1
    - If both agent bits are set then Agent1 quits loop and Agent2 quits the loop 6. Both agents now reset lock_addr1 locations in a first and loop until both agents reset
7. Both agents will then reset lock_addr2 in similar fashion to get both arrays ready for next syncup.

FIG. 5

```
1. do{ # Everyone waits on lock_adr2 to become 0
2.  lock_adr2_sum = 0;
3.  for(i = 0;i < num_agents;i++)
4.  lock_adr2_sum += lock_adr2[i]; # At init, lock_adr2 should be "0" in every bit
5. }while(lock_adr2_sum != 0);
6. lock_adr1[cpuid] = 1; # each agent announces its arrival
7. do{
8.  lock_adr1_sum = 0;
9.  for(i = 0;i < num_agents;i++)
10. lock_adr1_sum += lock_adr1[i];
11. }while(lock_adr1_sum != num_agents); # Each agent checks if everyone arrived
12. lock_adr2[cpuid] = 1; # Everyone declares that they are ready to depart
13. do{
14. lock_adr2_sum = 0;
15. for(i = 0;i < num_agents;i++)
16. lock_adr2_sum += lock_adr2[i];
17. }while(lock_adr2_sum != num_agents); # Everyone knows that everyone is ready to depart
18. lock_adr1[cpuid] = 0; # depart for next loop
19. do{
20. lock_adr1_sum = 0;
21. for(i = 0;i < num_agents;i++)
22. lock_adr1_sum += lock_adr1[i]; #
23. }while(lock_adr1_sum != 0); # Each agent sees each agent has departed.
24. lock_adr2[cupid]=0; # Announce arrival ready 25. Ready to Execute Test Case
```

FIG. 8

SYNCHRONIZATION OF HARDWARE AGENTS IN A COMPUTER SYSTEM

BACKGROUND

1. Technical Field

This disclosure generally relates to computer hardware testing and utilization, and more specifically relates to a system and method for synchronization of multiple hardware agents in a computer system where the agents do not share a hardware synchronization system.

2. Background Art

Many computer systems include multiple components or agents that communicate on a common bus. The agents include processors and other components connected to the bus such as graphics processing units (GPUs). In some cases the agents access a common memory system. Computer systems with multiple processors typically have hardware methods for synchronization of the processors such as using barrier registers or atomic operations. However, these hardware synchronization methods do not allow synchronization of the non-processor agents in the computer system.

There are times where synchronization of the agents beyond the processors would be advantageous. For example, to stress test the memory model of a computer system it is important to test data sharing between the agents in the common memory system. When testing a computer system, test cases attempt to stress various timing scenarios and operations, including the coherency of memory. Coherency in the memory involves insuring that changes to data in a memory cache are accurately reflected to main memory to keep the data consistent. Synchronization of the agents before they access the shared memory insures data access collisions to stress test the common memory system.

BRIEF SUMMARY

The disclosure and claims herein relate to a system and method for synchronizing heterogeneous agents in a computer system with a software synchronization mechanism. Agents of the computer system connected to a common memory, including agents lacking a hardware synchronization system, are synchronized with the software synchronization mechanism. The synchronized agents can cause collisions on the same cache line in order to stress test the memory of the system. The synchronization mechanism in each agent updates a first array to indicate it has arrived at the synchronization. After all the agents have arrived, each agent then updates a second array to announce its exit.

The foregoing and other features and advantages will be apparent from the following more particular description, as illustrated in the accompanying drawings.

BRIEF DESCRIPTION OF THE SEVERAL VIEWS OF THE DRAWINGS

The disclosure will be described in conjunction with the appended drawings, where like designations denote like elements, and:

FIG. 5 illustrates an example of synchronizing two agents by the synchronization mechanism;

FIG. 8 is an example of pseudo code for implementing the synchronization mechanism.

DETAILED DESCRIPTION

The disclosure and claims herein relate to a system and method for synchronizing heterogeneous agents in a computer system with a software synchronization mechanism. Agents of the computer system connected to a common memory, including agents lacking a hardware synchronization system, are synchronized with the software synchronization mechanism. The synchronized agents can cause collisions on the same cache line in order to stress test the memory of the system. The synchronization mechanism in each agent updates a first array to indicate it has arrived at the synchronization. After all the agents have arrived, each agent then updates a second array to announce its exit.

Figure 1:
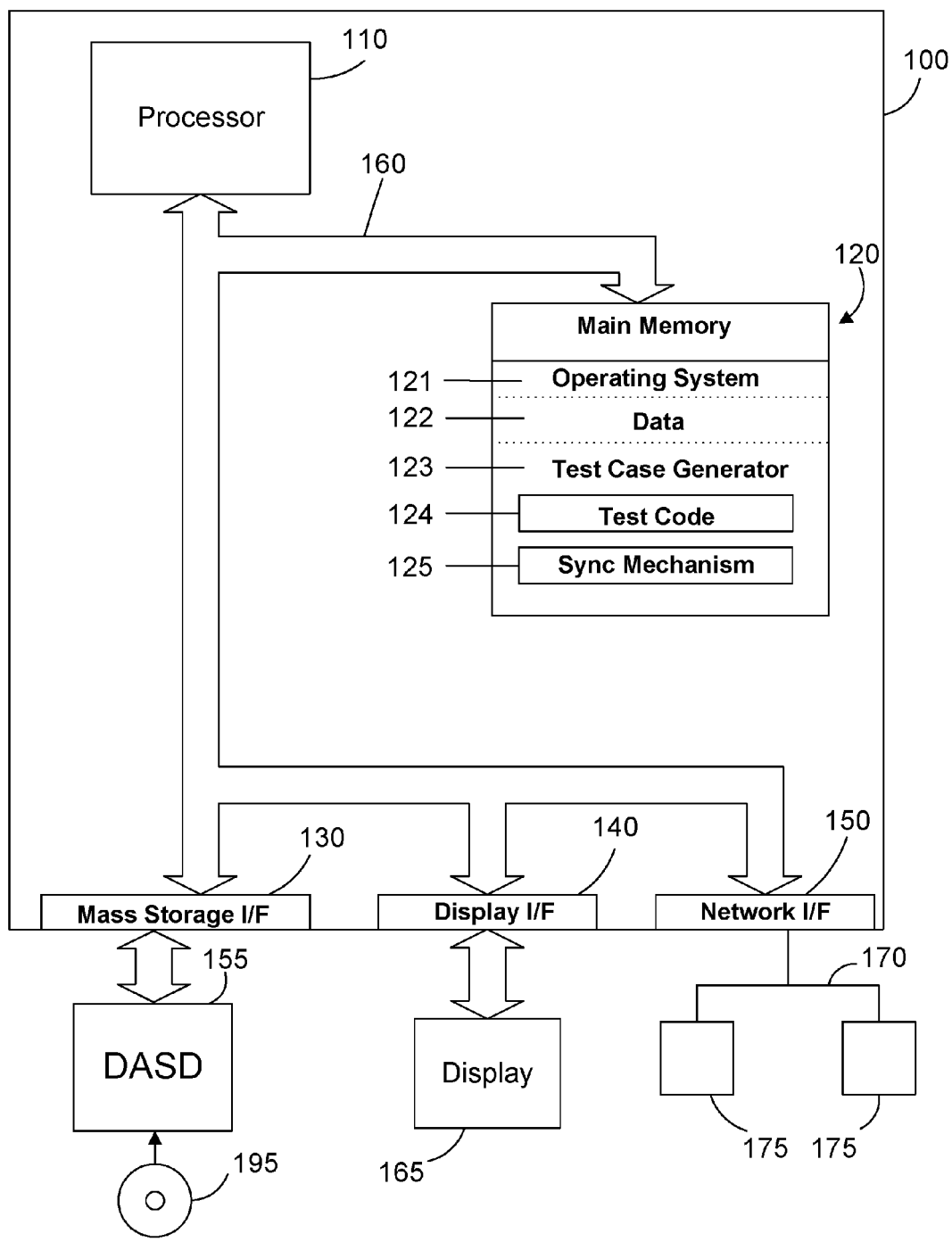
FIG. 1 is a block diagram of a computer system with a synchronization mechanism as described herein to synchronize agents of the computer system.

Referring to FIG. 1, a computer system 100 is one suitable implementation of a computer system that is capable of performing the computer operations described herein including synchronization of hardware agents as described herein. Computer system 100 is a computer which can run multiple operating systems including the IBM i operating system. However, those skilled in the art will appreciate that the disclosure herein applies equally to any computer system, regardless of whether the computer system is a complicated multi-user computing apparatus, a single user workstation, laptop, phone or an embedded control system. As shown in FIG. 1, computer system 100 comprises one or more processors 110. The computer system 100 further includes a main memory 120, a mass storage interface 130, a display interface 140, and a network interface 150. These system components are interconnected through the use of a system bus 160. Mass storage interface 130 is used to connect mass storage devices with a computer readable medium, such as direct access storage devices 155, to computer system 100. One specific type of direct access storage device 155 is a readable and writable CD-RW drive, which may store data to and read data from a CD-RW 195. Some devices may have a removable memory card or similar for a direct access storage device 155 instead of the CD-RW drive.

Main memory 120 preferably contains an operating system 121. Operating system 121 is a multitasking operating system known in the industry as IBM i; however, those skilled in the art will appreciate that the spirit and scope of this disclosure is not limited to any one operating system. The memory 120 further includes data 122 and a test case generator 123. The memory 120 also includes test code 124 and a synchronization mechanism 125 as discussed in more detail below.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while operating system 121, data 122, test case generator 123, test code 124 and synchronization mechanism 125 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 121 and later executes the program instructions that make up the test case generator 123 to generate the test code 124 and the synchronization mechanism 125 as directed by a user or other software.

Although computer system 100 is shown to contain only a single processor and a single system bus, those skilled in the art will appreciate that the system may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150, e.g. web client based users.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
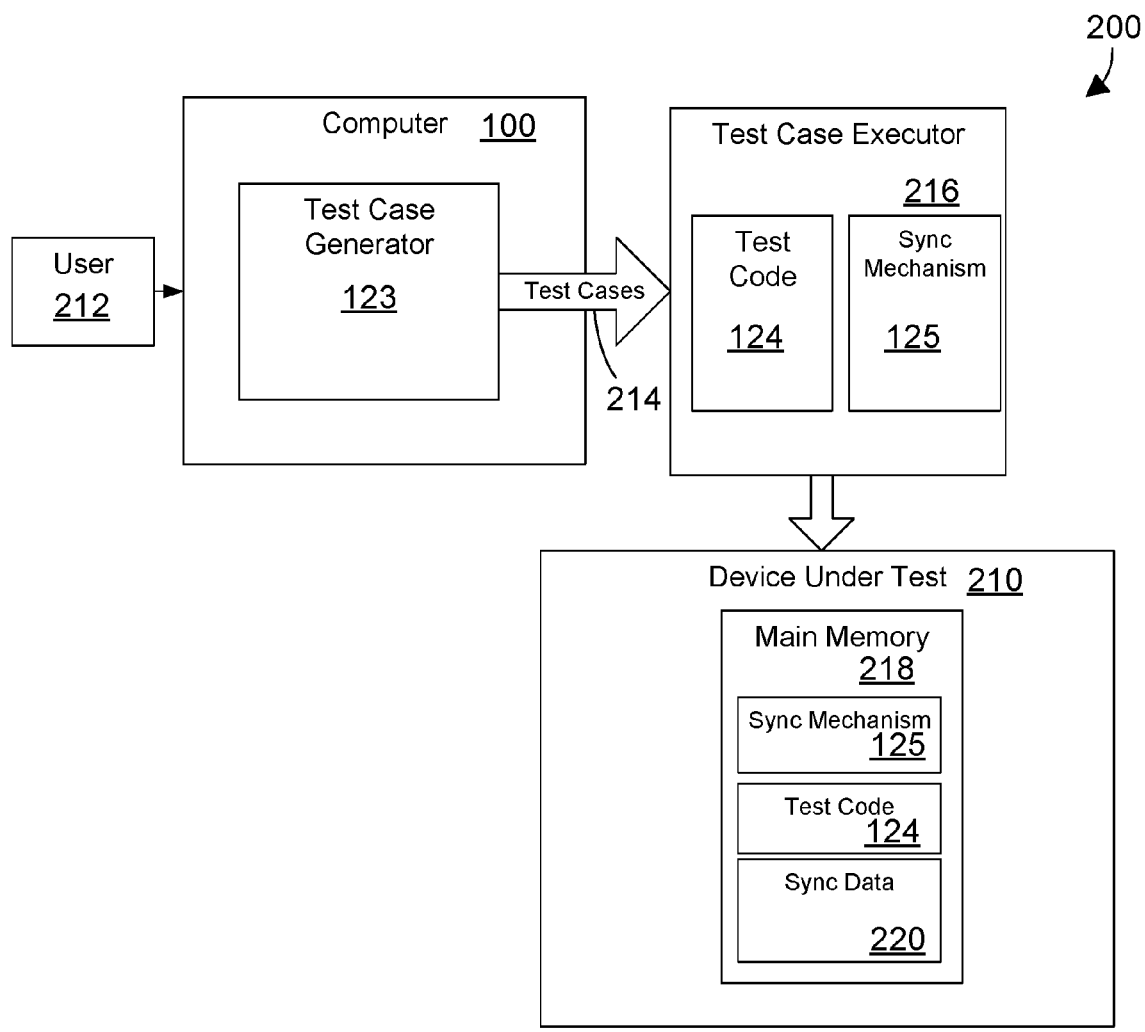
FIG. 2 illustrates simplified block diagram of a system for testing a processor with test code having a synchronization mechanism and synchronization arrays as described herein.

FIG. 2 illustrates a simplified block diagram of a computer system 200 that uses synchronization data for a software synchronization mechanism such as 125 in FIG. 1 to synchronize heterogeneous agents of the computer system. In this example, the agents of the computer system are synchronized to stress test a device under test (DUT) 210. A user 212 or an operator uses the test case generator 123 to provide tests cases 214 to a test case executor 216. The test case generator 123 and the test case executor 216 operate in a manner similar to the prior art except as described herein. The test cases 214 include test code 124 and may include a synchronization mechanism 125. The test case executor 216 loads the test code 124 and the synchronization mechanism 125 into the main memory 218 of the device under test 210. The synchronization mechanism 125 synchronizes two or more agents so that the test code 124 can stress test the device under test 210. Synchronization of the agents can insure comprehensive testing of memory and handling of shared caches between the agents. The synchronization mechanism 125 uses synchronization data 220 to synchronize the agents as described further below. The synchronization data 220 includes arrival data and departure data as described further below.

Figure 3:
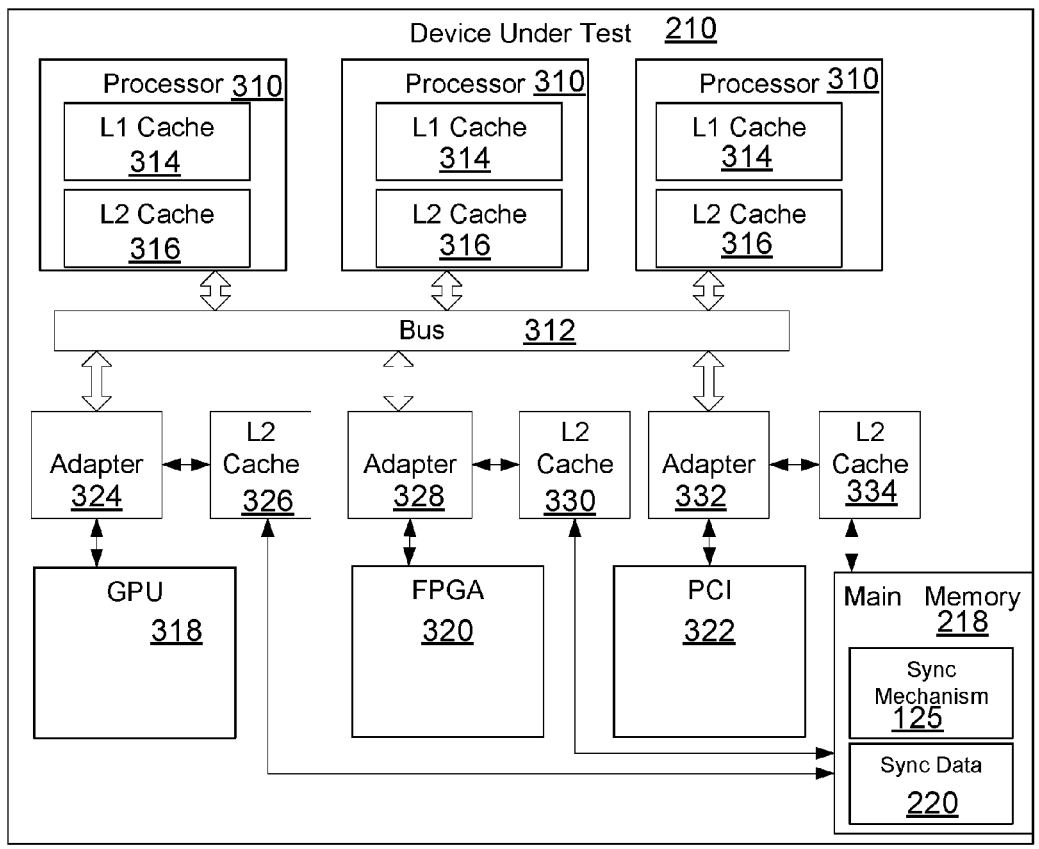
FIG. 3 is a simplified block diagram of a system using a synchronization mechanism to synchronize agents as described herein.

FIG. 3 illustrates a simplified block diagram of a system that uses a synchronization mechanism 125 with synchronization data 220 to synchronize agents of the system. In this example, the system is a device under test (DUT) 210 as introduced in FIG. 2. The DUT 210 may be a computer system similar to that shown in FIG. 1. The DUT 210 in this example includes three processors 310 interconnected by a bus 312. Each processor 310 may further include an L1 cache 314 and an L2 cache 316. In addition to the processors 310, the DUT 210 may include additional heterogeneous agents connected to the bus 312 that do not have a common method to synchronize the agents. In this example, these additional agents include a graphics processing unit (GPU) 318, a field programmable gate array (FPGA) 320 and a peripheral component interconnect (PCI) 322. The synchronization mechanism executing on the heterogeneous agents provides efficient and reliable synchronization that can be optimized based on cache organization, and the instructions and operations that are available on each of the heterogeneous agents.

Again referring to FIG. 3, each of the additional agents (besides the processors) include an adapter that interfaces the agent to the bus 312. The GPU agent 318 has an adapter 324. The FPGA agent 320 has an adapter 328. And the PCI agent 322 has an adapter 332. The adapters 324, 328, 332 are connected to a corresponding L2 cache 326, 330, 334 for each of the agents 318, 320, 322 respectively. The L2 caches 326, 330, 334 are connected to a common main memory 218. The synchronization mechanism 125 uses the synchronization data 220 to synchronize the agents (processors 310, GPU 318, FPGA 320 and PCI 322). In the example described below, the agents are synchronized before running test cases that stress test the DUT's handling of cache memory updates between the various L2 caches and main memory.

In FIG. 3 the synchronization mechanism 125 is shown to reside in main memory 218. While it is not shown in FIG. 3, portions or copies of the synchronization mechanism 125 may also reside in the non-CPU agents 318, 320, 322. Each agent participating in synchronization executes the synchronization mechanism to ensure the agent is synchronized with the other agents. One copy of the synchronization mechanism may act as a master and set up which agents will participate in the event. Alternatively other software such as the test code 124 (FIG. 2) can set up the group of agents participating in synchronization.

As introduced above, the synchronization data 220 (FIG. 3) is used by the synchronization mechanism 125 to synchronize the agents. The synchronization data 220 includes data to indicate arrival and departure of each of the agents in the computer system that participate in synchronization. The synchronization data could be implemented with an array of bits, bytes, words, flags or other suitable data structure.

Regardless of the actual data structure used, the description herein will refer to the synchronization data as an array. In the example shown in FIG. 4, the synchronization data is a word of memory with sixteen bits. These sixteen bits can be characterized as a memory array. Alternatively the synchronization data 220 could be implemented with any other data structure that allows the synchronization mechanism to set and reset a bit or flag to indicate arrival and departure as described herein.

Figure 4:
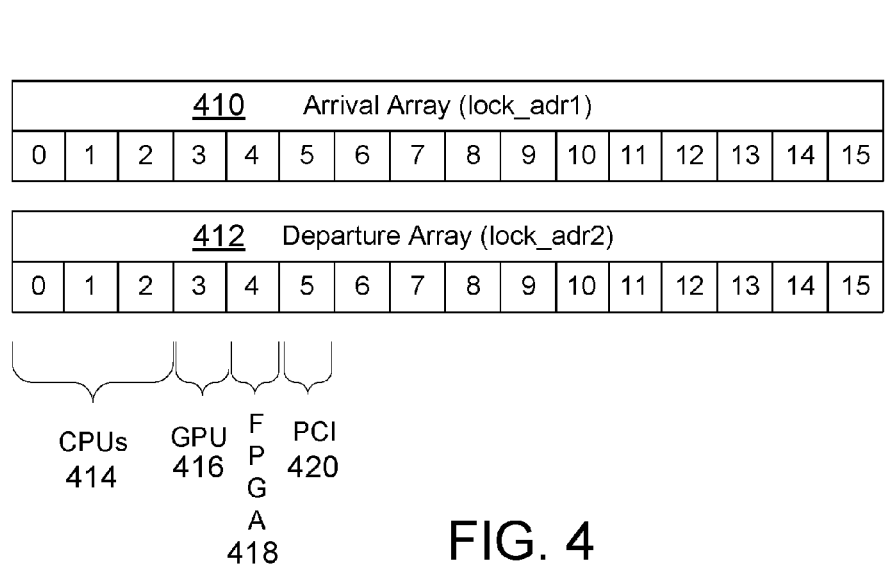
FIG. 4 is a simplified block diagram of synchronization arrays used by the synchronization mechanism.

FIG. 4 illustrates a simplified example of the synchronization data 220 used by the synchronization mechanism 125 described above. In this example, the synchronization data 220 used by the synchronization mechanism includes an arrival array 410 and a departure array 412. In this example, the arrival array 410 and the departure array 412 each comprise sixteen bits of data. One bit of data in each of the arrays is assigned to each of the agents in the system that is being synchronized. Assignments in the synchronization arrays 220 are shown for the agents of the DUT described above with reference to FIG. 3. The first three bits (0, 1, 2) 414 are assigned to the processors (CPUs) 310 (shown in FIG.3). Bit 3 416 is assigned to the GPU 318. Bit 4 418 is assigned to the FPGA 320, and bit 5 420 is assigned to the PCI 322. The bits are set and reset by the synchronization mechanism to indicate the corresponding agent has arrived and departed from synchronization as described further below.

FIG. 5 illustrates an example of the synchronization mechanism synchronizing two agents. This example uses pseudo code type nomenclature in addition to describing each step. In the pseudo code, "lock_addr1" refers to the bit in the arrival array described above with reference to FIG. 4. Similarly, "lock_addr2" refers to the departure array. In this example, it is assumed that only two agents, "Agent1" and "Agent2" are participating in the synchronization. In step 1, each of the agents determines that the arrival array is initially all zero. In step 2, Agent 1 first writes to the arrival array to indicate arrival. Agent 1 remains in this loop waiting for the remaining agents. In step 3, Agent2 also indicates arrival in lock_addr1 (the arrival array). At this point, since the sum of agents indicating arrival is now two (the total agents participating) Agent2 and Agent1 quit the arrival loop. In step 4, Agent2 then sets its bit in lock_addr2 (the departure array) indicating it is ready to depart. Since Agent1 has not set a corresponding bit in lock_addr2, Agent2 continues to stay in the departure loop. In step 5, Agent 1 sets a corresponding bit in lock_addr2. Both agents now see that the sum of bits set indicate all the participating agents are ready to depart, so both Agent1 and Agent2 quit this loop and depart. In step 6, both agents reset their corresponding bit in lock_addr1. In step 7, both agents reset their corresponding bit in lock_addr2 to get the arrays ready for the next synchronization cycle.

Figure 6:
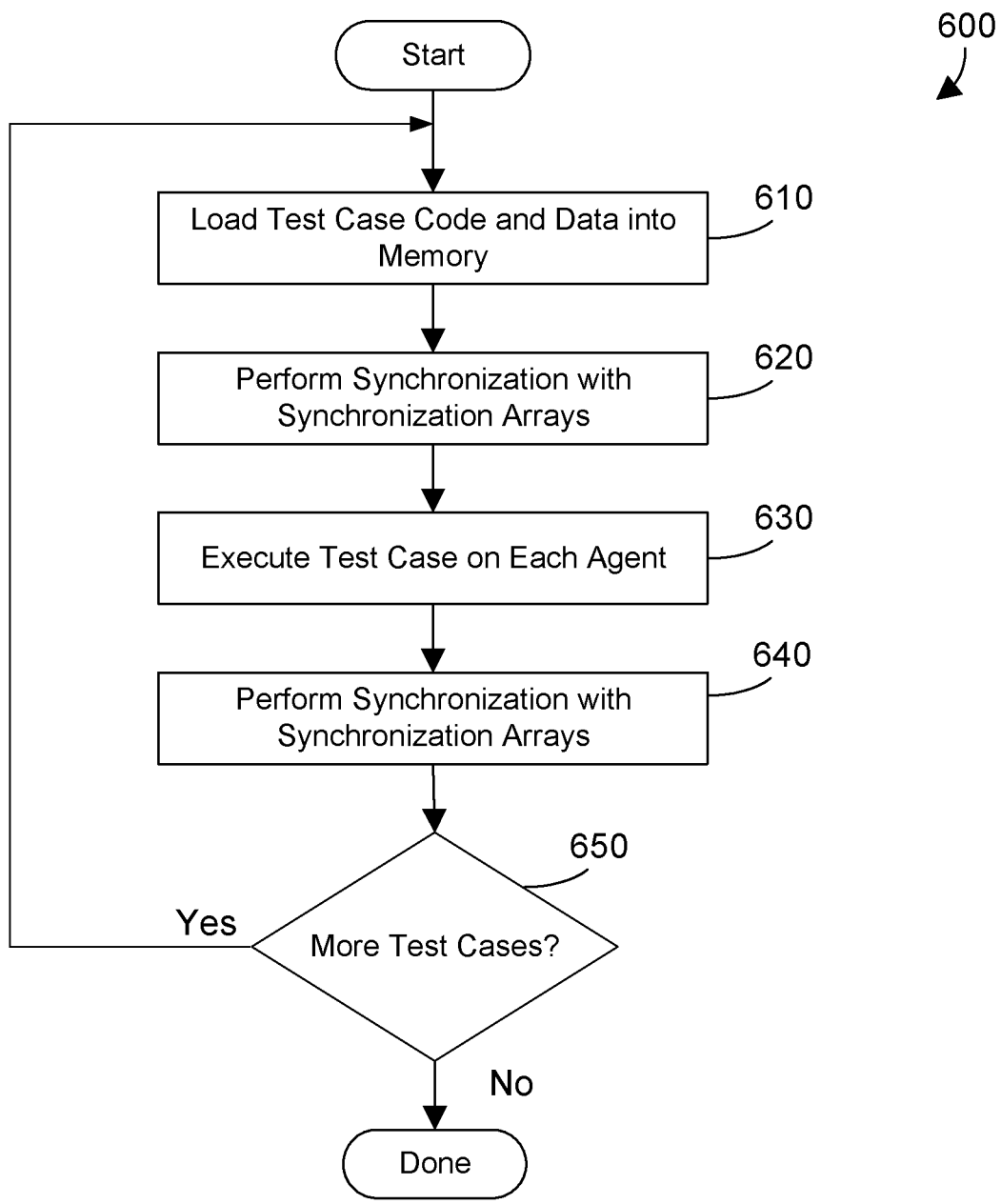
FIG. 6 is a flow diagram of a method for synchronizing agents of a system including agents that lack hardware synchronization using synchronization arrays.

Referring to FIG. 6, a method 600 shows one suitable example for synchronized testing of a system where the system agents lack a hardware synchronization system by synchronizing the agents using synchronization arrays. Portions of method 600 are preferably performed by the test case executor 216 and the synchronization mechanism 125 shown in FIG. 2. First, load test case code and data into memory (step 610). Next, perform synchronization of the agents in the test with synchronization arrays (step 620). Execute the test case on each agent (step 630). Perform synchronization of the agents in the test with synchronization arrays to insure all agents are in synchronization from the last sequence to prepare for a next test (step 640). If there are additional test cases (step 650=yes) then go to step 610. If there are no additional test cases (step 650=no) then the method 600 is then done.

Figure 7:
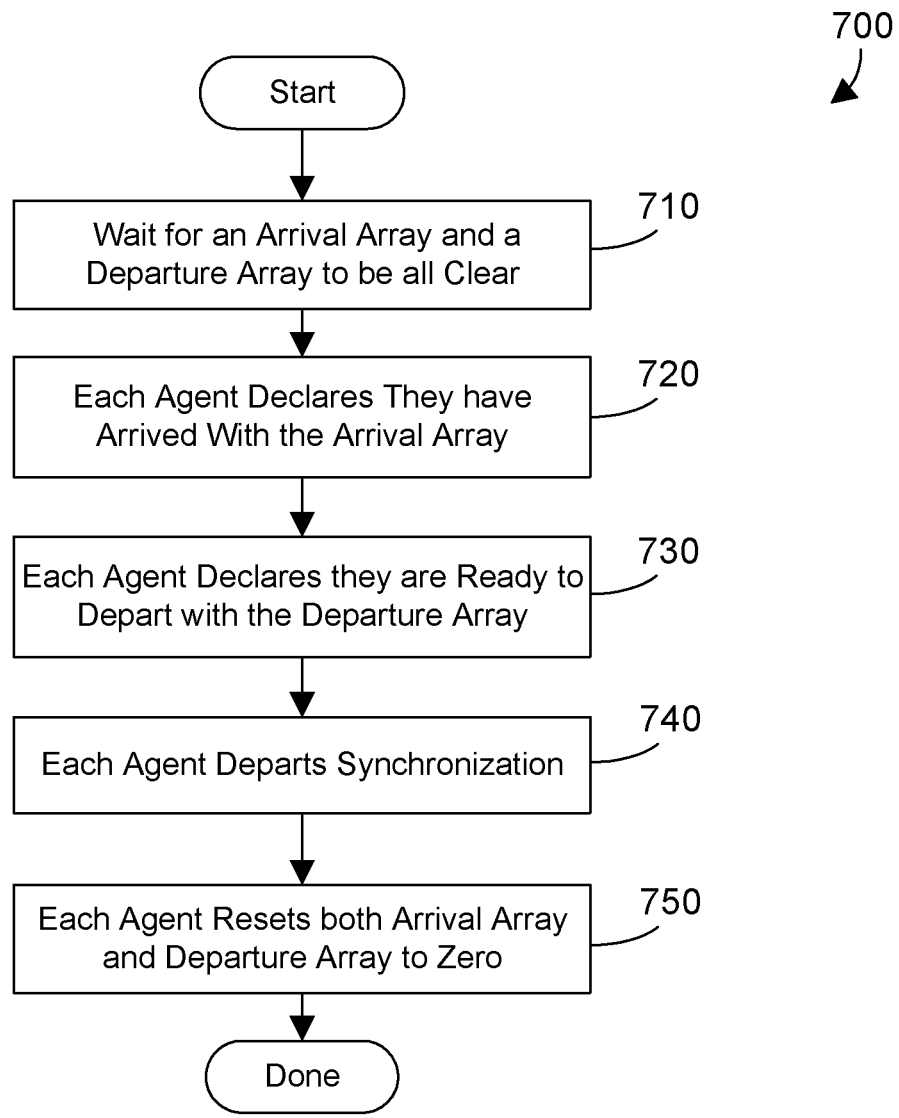
FIG. 7 is a flow diagram of a specific method for steps 620 and 640 in FIG. 6.

FIG. 7 shows one suitable example of a method 700 for synchronization of agents of a system with synchronization arrays. Method 700 thus shows a suitable method for performing step 620 in method 600. The steps are typically performed by each agent of the system active in the synchronization. First, wait for the arrival array and the departure array to be all clear (e.g. all zeros) for each agent indicating the agents are all ready for synchronization (step 710). Each agent declares they have arrived with the arrival array (step 920). For example, the agent may declare arrival by setting a single bit corresponding to the agent in the arrival array. Each agent declares they are ready to depart with the departure array (step 730). When all agents participating in the synchronization have indicated they are ready to depart in step 730 then each agent departs the synchronization routine (step 740). Each agent resets their corresponding bit in both the arrival array and the departure array (step 750). The method 700 is then done.

FIG. 8 is an example of pseudo code for implementing the synchronization mechanism. This pseudo code is an example of one specific implementation of the method described in FIG. 7. Further, this pseudo code uses the same nomenclature used in the example described with reference to FIG. 5. Lines 1 through 5 are an example of the agents waiting until all the bits are zero to indicate the end of the last synchronization cycle. Lines 6 through 10 are an example of each agent announcing its arrival at synchronization. Line 11 is an example of checking to see if everyone has arrived. Lines 12 through 16 are an example of the agents declaring they are ready to depart. Line 17 is an example of the agents determining that the other agents are ready to depart. Lines 18 through 22 are an example of the agents departing for the next loop. Line 23 is an example of each agent seeing that the other agents have departed. Line 24 is an example of the agents clearing the departure array to announce it is ready for arrival on the next cycle.

The disclosure and claims herein relate to a system for synchronizing agents in a computer system with a software synchronization mechanism. Agents of the computer system connected to a common memory are synchronized with the software synchronization mechanism. The synchronized agents can advantageously be used to cause collisions on the same cache line in order to stress test the memory of the system.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus for testing a computer processing system comprising:
  a synchronization mechanism executing on a plurality of agents of the computer processing system that synchronizes the plurality of agents using synchronization data stored in memory that includes arrival data to indicate agents of the plurality of agents that have arrived at synchronization and departure data that indicates agents of the plurality of agents that are ready to depart synchronization;
  wherein the arrival data includes data for each agent participating in synchronization that is set upon arrival of a corresponding agent and the departure data includes data for each agent participating in synchronization that is set when a corresponding agent is ready for departure from synchronization;
  wherein the arrival data further comprises an arrival array with a bit of data for each agent participating in synchronization and the departure data comprises a departure array with a bit of data for each agent participating in synchronization; and wherein the plurality of agents determine whether all the plurality of agents participating in synchronization have arrived by summing the at least one bit of data in the arrival array.

2. The apparatus of claim 1 further comprising;

a test case generator that allows a user to create test cases with test code and test data;

a test case executor that loads the test code on the computer processing system; and wherein the synchronization mechanism synchronizes the plurality of agents prior to executing a test case that tests cache coherency handling of memory accesses to cache memory of the plurality of agents.

3. The apparatus of claim 1 wherein the plurality of agents determine whether all the plurality of agents participating in synchronization are ready for departure by summing the at least one bit of data in the departure array.

4. The apparatus of claim 3 wherein the agents depart synchronization when the sum of bits in the departure array equals the number of agents participating in synchronization.

5. The apparatus of claim 1 wherein after the agents depart synchronization the agents reset the at least one bit in the arrival array and the at least one bit in the departure array.

6. The apparatus of claim 1 wherein each agent participating in synchronization after departure from synchronization executes a test case that tests cache coherency handling of memory accesses to cache memory of the plurality of agents.

7. A computer-implemented method executed by at least one processor for testing a computer system comprising:

loading test case code into memory;

performing synchronization of a plurality of agents of the computer system using arrival data to indicate agents of the plurality of agents that have arrived at synchronization and departure data that indicates agents of the plurality of agents that are ready to depart synchronization;

executing a test case on the synchronized plurality of agents;

wherein the arrival data comprises an arrival array with at least one bit of data for each agent participating in synchronization that is set upon arrival by each agent, and the departure data comprises a departure array with at least one bit of data for each agent participating in synchronization that is set when the agent is ready for departure from synchronization; and wherein the plurality of agents determine whether all the plurality of agents participating in synchronization have arrived by summing the at least one bit of data in the arrival array.

8. The method of claim 7 wherein the step of performing synchronization of a plurality of agents further comprises:

each agent waiting for the arrival data and the departure data to be all clear;

each agent declaring they have arrived at synchronization with the arrival data;

each agent declaring they are ready to depart with the departure data; and each agent departing synchronization when all agents participating in the synchronization have indicated they are ready to depart.

9. The method of claim 7 wherein the plurality of agents determine whether all the plurality of agents participating in synchronization are ready for departure by summing the at least one bit of data in the departure array.

10. The method of claim 7 wherein the agents depart synchronization when the sum of bits in the departure array equals the number of agents participating in synchronization.

11. The method of claim 8 wherein after the agents depart synchronization the agents reset the at least one bit in the arrival array and the at least one bit in the departure array.

12. The method of claim 8 wherein each agent participating in synchronization after departure from synchronization executes a test case that tests cache coherency handling of memory accesses to cache memory of the plurality of agents.

13. A computer-implemented method executed by at least one processor for testing a computer system comprising:

loading test case code into memory;

performing synchronization of a plurality of agents of the computer system using an arrival array to indicate agents of the plurality of agents that have arrived at synchronization and a departure array that indicates agents of the plurality of agents that are ready to depart synchronization, wherein the arrival array comprises at least one bit of data for each agent participating in synchronization that is set upon arrival by each agent and the departure array comprises at least one bit of data for each agent participating in synchronization that is set upon departure from synchronization;

wherein the synchronization comprises the steps of:

each agent waiting for the arrival array and the departure array to be all clear;

each agent declaring they have arrived at synchronization with the arrival array and the plurality of agents determining whether all the plurality of agents participating in synchronization have arrived by summing the at least one bit of data in the arrival array;

each agent declaring they are ready to depart with the departure array; and each agent departing synchronization when all agents participating in the synchronization have indicated they are ready to depart;

executing a test case on the synchronized plurality of agent;

wherein the plurality of agents determine whether all the plurality of agents participating in synchronization have departed by summing the at least one bit of data in the departure array; and wherein the agents depart synchronization when the sum of bits in the departure array equals a number of agents participating in synchronization.

14. The method of claim 13 wherein after the agents depart synchronization the agents reset the at least one bit in the arrival array and the at least one bit in the departure array.

15. The method of claim 13 wherein each agent participating in synchronization after departure from synchronization executes a test case that tests cache coherency handling of memory accesses to cache memory of the plurality of agents.

* * * * *